July 20, 1943. B. JORGENSEN 2,324,512
UPPER TRIMMING MEANS
Original Filed Feb. 4, 1941 5 Sheets-Sheet 1
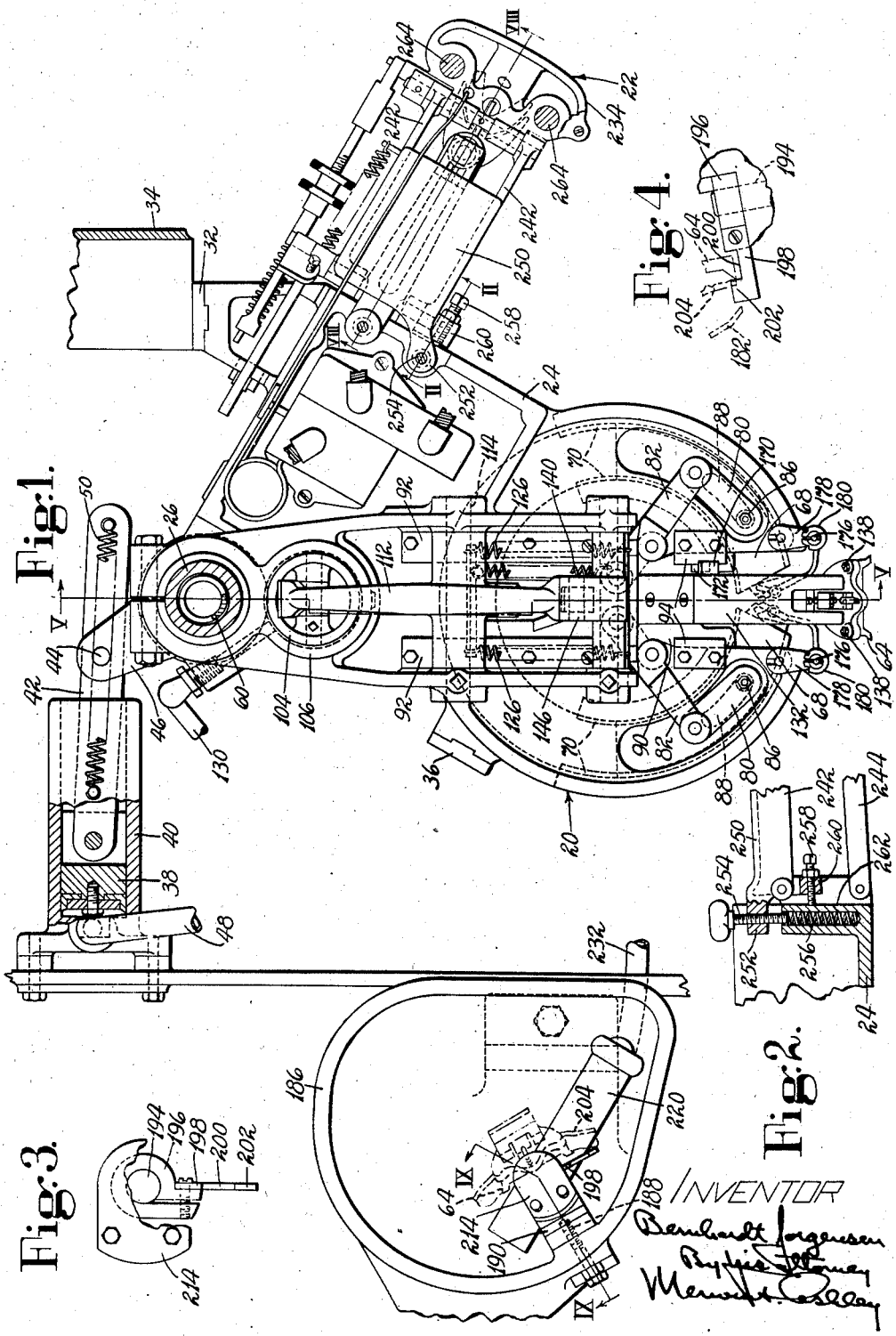

July 20, 1943.   B. JORGENSEN   2,324,512
UPPER TRIMMING MEANS
Original Filed Feb. 4, 1941   5 Sheets-Sheet 2
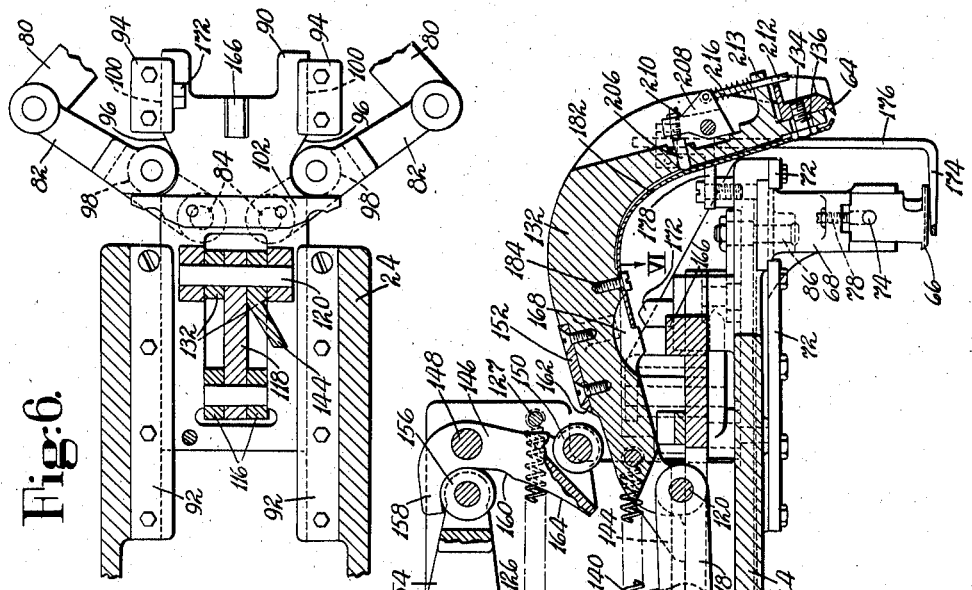
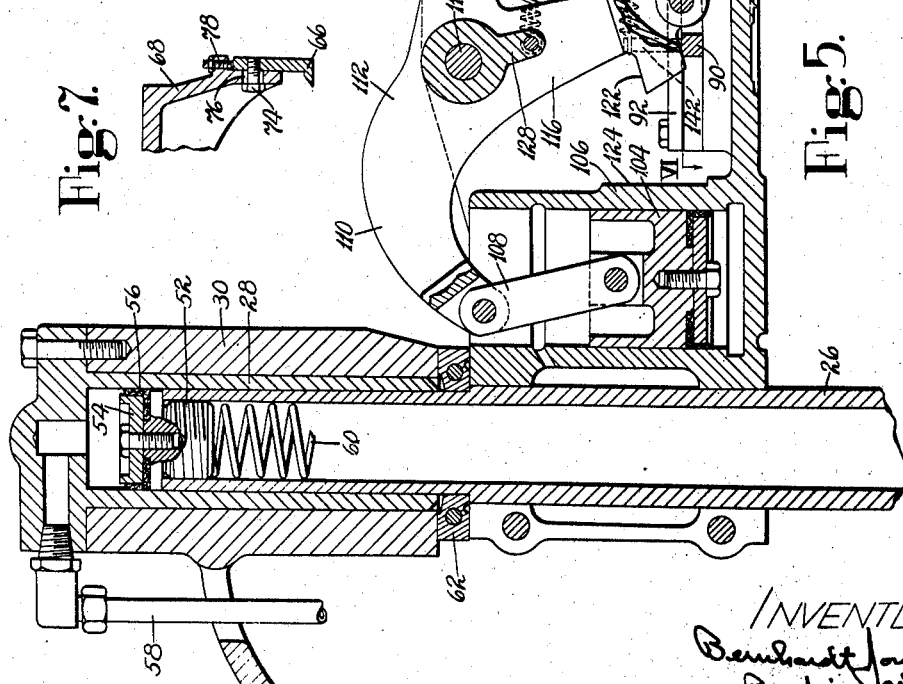

July 20, 1943.  B. JORGENSEN  2,324,512
UPPER TRIMMING MEANS
Original Filed Feb. 4, 1941    5 Sheets-Sheet 3
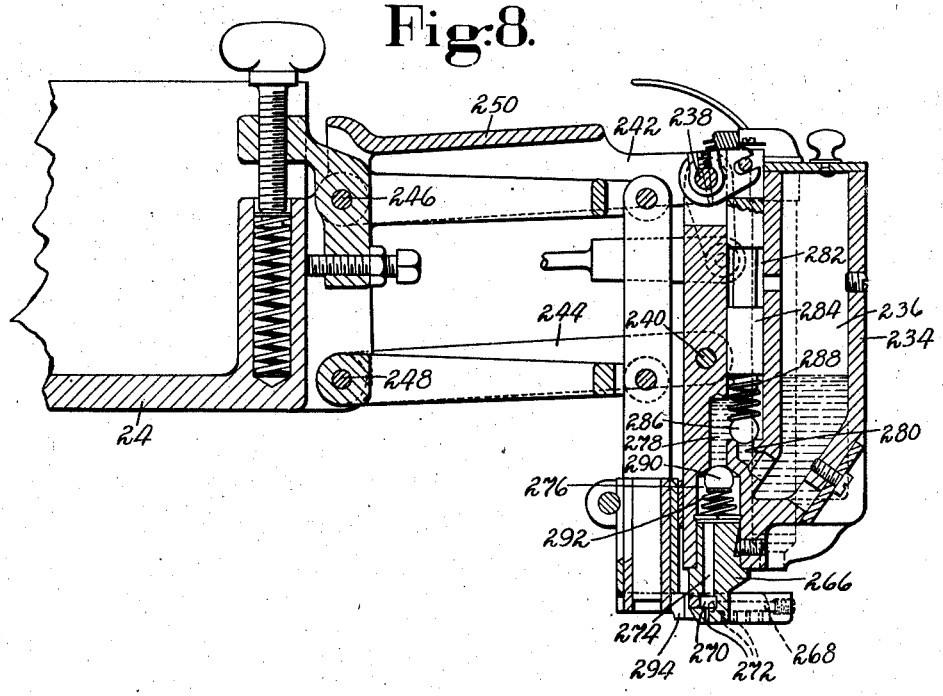
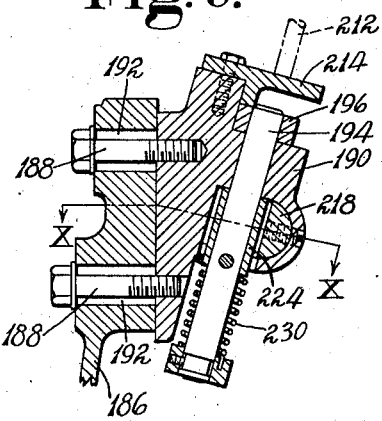
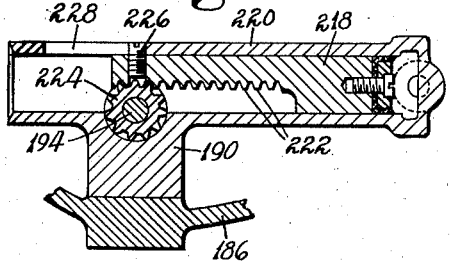
INVENTOR
Bernhardt Jorgensen

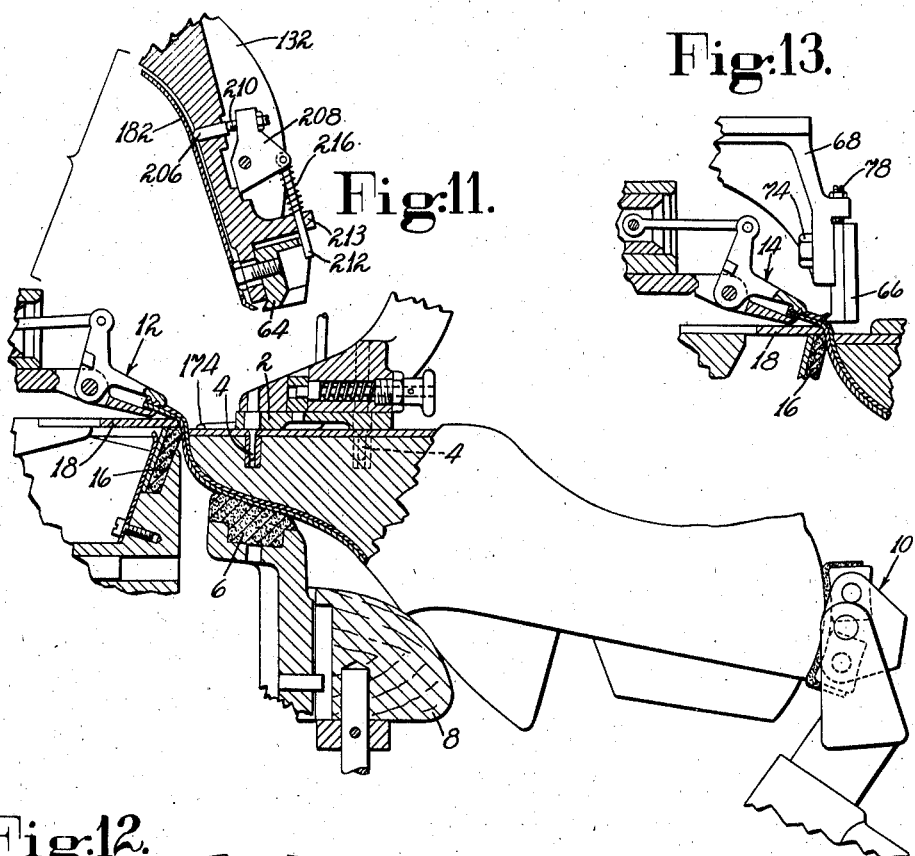
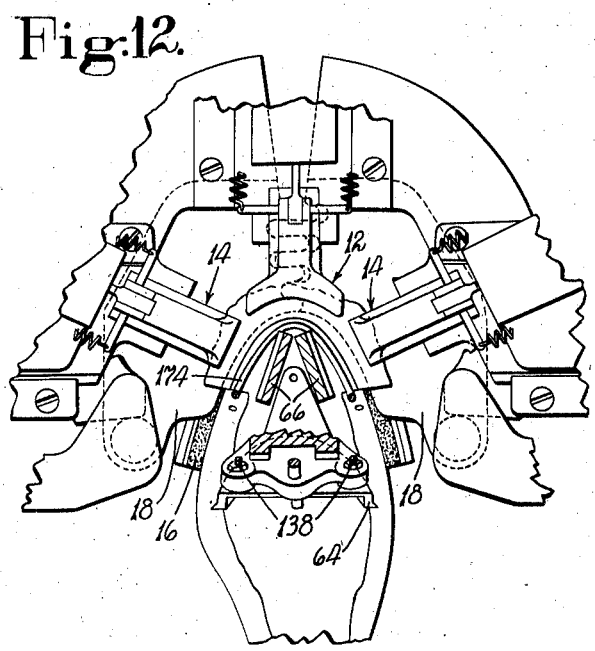

July 20, 1943.  B. JORGENSEN  2,324,512
UPPER TRIMMING MEANS
Original Filed Feb. 4, 1941  5 Sheets-Sheet 5

Patented July 20, 1943

2,324,512

UNITED STATES PATENT OFFICE 2,324,512

UPPER-TRIMMING MEANS

Bernhardt Jorgensen, Marblehead, Mass., assignor to United Shoe Machinery Corporation, Flemington, N. J., a corporation of New Jersey Original application February 4, 1941, Serial No. 377,347. Divided and this application May 15, 1942, Serial No. 443,097

40 Claims. (Cl. 12—83.5)

This invention relates to upper-trimming means, this application being a division of a copending application of mine for Letters Patent for improvements in Machines for use in the manufacture of shoes, Serial No. 377,347, filed on February 4, 1941. A particular object of the invention is to provide means for trimming from the toe end of a multi-ply upper on a last the margin of one or more inner layers of the upper materials while leaving a margin of the outer layer to be lasted inwardly over an insole on the last, and the invention is herein illustrated as embodied in mechanism constructed for that purpose as part of the machine shown and described in the above-mentioned application, which is a machine for lasting the toe ends of shoes. It is to be understood, however, that the invention is not limited to that particular embodiment or to upper-trimming means which is part of a lasting machine.

In one aspect, the invention provides novel upper-trimming means comprising a plurality of trimming knives movable outwardly from positions opposite the bottom of the last to perform the trimming operation, the construction shown comprising a pair of side knives movable apart widthwise of the last to trim the upper at the sides of the toe and a middle knife movable lengthwise of the last to trim it at the end of the toe. To enable these knives thus to operate in proper relation to one another, the construction shown is further such that the side knives act first on the upper, thus providing sufficient space between them for the middle knife, whereupon the latter is moved heightwise of the last to the same plane as the side knives and then completes the upper-trimming operation by movement lengthwise of the last.

In accordance with another feature, the invention provides a novel construction whereby the upper-trimming means is first positioned relatively to the work by fluid pressure and is thereafter operated by fluid pressure to perform the upper-trimming operation. In its embodiment of this feature the construction shown comprises a fluid-operated device for moving the upper-trimming means relatively to the last into position for operating on the upper, and another fluid-operated device which partakes of that positioning movement of the upper-trimming means and thereafter imparts operative movement to the trimming means.

In order to relieve the operator of any concern with reference to disposal of the waste material removed from the upper, the invention further provides novel means for controlling that material. As herein illustrated, the above-mentioned middle trimming knife has associated with it a waste-retaining member which cooperates with the knife to hold the waste material as the upper-trimming means is moved away from the work after the upper-trimming operation, and this member is operated automatically to release the material over a receptacle provided to receive it. To afford still better insurance that the waste material will be properly disposed of, the construction shown further includes a device which is movable relatively to the middle knife to remove the waste material therefrom if it does not fall upon its release by the above-mentioned waste-retaining member.

The above and other features of the invention, including novel holddown means for controlling the margin of the insole in the upper-trimming operation and various novel details of construction and combinations of parts, will now be more particularly described with reference to the accompanying drawings and thereafter pointed out in the claims.

In the drawings,

Fig. 1 is mainly a plan view of a portion of the machine shown in the above-mentioned application, comprising upper-trimming means in which novel features of the present invention are embodied and cement-applying means associated therewith;

Fig. 2 is a section on the line II—II of Fig. 1;

Fig. 3 is substantially a plan view, with parts broken away, showing in greater detail mechanism which appears at the left-hand side of Fig. 1 for removing waste material from the trimming means;

Fig. 4 is a view in elevation illustrating the action of the waste-removing mechanism shown in Fig. 3;

Fig. 5 is a section on the line V—V of Fig. 1;

Fig. 6 is a section on the line VI—VI of Fig. 5;

Fig. 7 is a vertical section through one of the side-trimming knives and its support;

Fig. 8 is a section on the line VIII—VIII of Fig. 1, on an enlarged scale;

Fig. 9 is a section on the line IX—IX of Fig. 1;

Fig. 10 is a section on the line X—X of Fig. 9;

Fig. 11 is a view partly in elevation and partly in section illustrating the relation to the shoe of parts that operate thereon at a time in the cycle immediately prior to the upper-trimming operation;

Fig. 12 is mainly a plan view showing the parts in the positions which they occupy at the same time in the cycle as in Fig. 11;

Fig. 13 is mainly a vertical sectional view showing certain parts as they appear at the beginning of the trimming operation;

Figure 14:
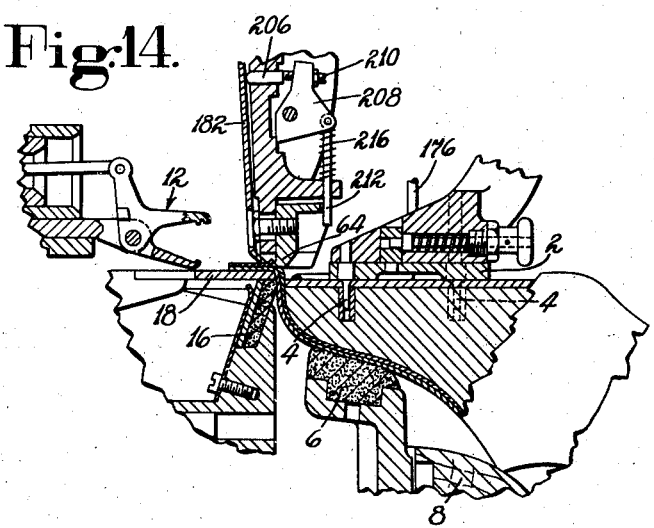
Figs. 14, 15 and 16 are sectional views illustrating progressively the positions of the parts at other times thereafter in the operation of the machine.

The machine shown in the above-mentioned application, in which the present invention is herein illustrated as embodied, is a power-operated lasting machine having means for lasting the toe end of a shoe positioned bottom upward. The shoe is thus positioned in proper relation to the lasting means by a member 2 (Fig. 11) which engages the bottom of the toe end of the insole and by a plurality of pins 4 which extend through holes in the insole into holes provided in the last. The operator mounts the shoe and last on the pins 4 with the insole in engagement with the member 2 prior to the starting of the cycle of power operations of the machine. After the starting of the machine a toe rest 6 and an instep support 8 are moved upwardly to clamp the shoe against the member 2 and to support it thereafter against downward movement during the operation of the machine. To assist also in supporting the shoe against lengthwise movement, a heel rest 10 is moved into engagement with the heel-end face of the shoe. The shoe having thus been positioned and supported, a plurality of grippers, comprising a toe-end gripper 12 and side grippers 14 (Fig. 12), which grip the margin of the several layers of the toe-end portion of the upper, are moved in outward directions lengthwise and widthwise of the shoe respectively to pull the upper and thus to assist in shaping it properly over the toe end of the last. Arranged to cooperate with these grippers in the lasting operation are a flexible toe former 16, which embraces the toe end of the shoe, and a pair of toe-embracing wipers 18. The toe former and the wipers are moved as a unit heightwise of the shoe to cause the toe former to wipe the upper upwardly to the edge of the insole while it is held under tension by the grippers, as illustrated in Fig. 11. Surplus marginal material is next trimmed from all but the outer layer of the toe-end portion of the upper by trimming means, hereinafter described, in which features of the present invention are embodied, the grippers releasing the upper to make way for the trimming means. Cement is then applied to the toe end of the shoe for securing the margin of the outer layer of the upper to the insole, and the wipers 18 are operated to wipe the margin of the outer layer inwardly over the insole. It will be understood that the nature of the operations thus briefly outlined and the construction of the machine as a whole are fully disclosed in the previously mentioned application.

For purposes of this invention there is provided an upper-trimming device indicated generally by the reference character 20 (Fig. 1), associated with which is a cement-applying device indicated generally by the reference character 22. Both these devices are supported on a carrier 24 clamped on a vertical hollow post 26. This post is guided for vertical movements and for turning movements in a cylinder 28 (Fig. 5) inserted in a tubular portion 30 of the frame of the machine and in another bearing (not herein shown) below the cylinder 28. By the vertical movements of the post the trimming device and thereafter the cement-applying device are moved downwardly each into position to operate on the shoe, and by the turning of the post the carrier 24 is swung to carry the different devices into positions where they are over the toe end of the shoe. Initially the carrier occupies the position in which it is shown, with the trimming device over the shoe, this position of the carrier being determined by engagement of a bumper 32 (Fig. 1) with a portion 34 of the frame of the machine. The other position of the carrier, when the cement-applying device is over the shoe, is determined by engagement of a bumper 36 on the carrier with another portion (not shown) of the frame. Swinging movement of the carrier into the last-mentioned position is effected by a piston 38 movable in a cylinder 40 fast on the frame, the piston being connected by a link 42 to a pin 44 mounted on an arm 46 which is connected to the post 26 for turning it but relatively to which the post may move in vertical directions. In communication with the cylinder 40 is a pipe line 48 leading to a source of supply of operating fluid and to valve mechanism whereby the admission of fluid to the cylinder and the exhaust of fluid therefrom are controlled automatically in the cycle of operations of the machine, as fully disclosed in the previously mentioned application. The link 42 extends beyond the pin 44, and connected to the extended portion of the link and to the cylinder 40 is a spring 50 which swings the carrier 24 to its initial position determined by engagement of the bumper 32 with the frame portion 34 when the fluid is permitted to exhaust from the cylinder.

The upper end of the hollow post 26 is closed by a plug 52 (Fig. 5) and a disk 54 fastened to this plug serves as a holder for packing 56. The upper end portion of the post serves, therefore, as a piston in the cylinder 28, and by fluid admitted to the upper end of the cylinder through a pipe line 58 downward movement is imparted to the post to carry the trimming device and the cement-applying device each into position to operate on the shoe. It will be understood that the pipe line 58 leads to the source of fluid supply and that the admission and exhaust of fluid to and from the cylinder 28 are controlled by appropriate automatic valve mechanism. The downward movement of the post is effected against the resistance of a spring 60 therein which bears at its upper end against the plug 52 and acts to return the post to its uppermost position when fluid is permitted to exhaust from the cylinder 28, the upward movement of the post being limited by engagement of a fibre bumper 62 supported on the hub of the carrier 24 with the lower end of the tubular portion 30 of the frame. The limit of the downward movement of the post, to position the trimming device and the cement-applying device in proper relation to the shoe heightwise thereof, is determined by means not herein shown but disclosed in the previously mentioned application.

Figure 15:
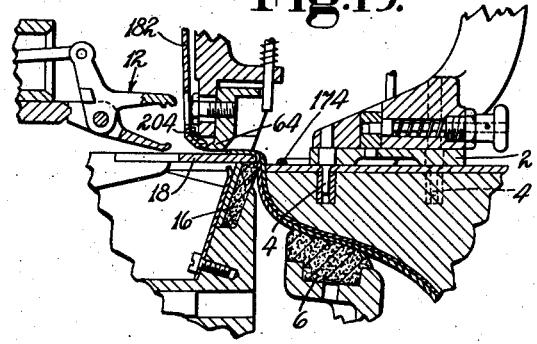

The upper-trimming device 20 comprises a middle knife 64 (Figs. 5 and 12) which is curved in general similarity to the curvature of the edge of the insole around the end of the toe and is movable lengthwise of the shoe toward the toe-end gripper 12, and two side knives 66 movable laterally of the shoe toward the side grippers 14 in paths curved about a vertical axis located opposite the end of the toe. The cutting edges of the several knives, in operating on the upper, move in a plane parallel to the top faces of the wipers and spaced from these faces a distance substantially equal to the thickness of the outer layer of the upper materials, so that as the marginal portions of the different layers are outturned over the wipers the knives sever the surplus marginal material of the inner layer or layers by cutting the material on a line parallel to the edge of the last bottom while leaving a margin of the outer layer to be lasted inwardly over the insole. As illustrated, the top faces of the wipers 18 (Fig. 11) are positioned at the time of the upper-trimming operation somewhat above the plane of the bottom face of the toe end of the insole, to leave enough of the inner layer or layers to overlap the extreme marginal edge of the insole when the wipers thereafter wipe the outer layer inwardly. It will be understood that the toe end of the upper materials usually comprises at least three layers, including a lining and a toe box in addition to the outer layer, but for convenience of illustration the drawings show only the lining in addition to the outer layer. As shown in Fig. 12, the shoe is preferably prepared for the operation of the machine by slitting the margin of the upper materials at the sides of the toe forwardly of the side pulling-over tacks, to facilitate turning of the margin of the toe-end portion of the materials outwardly in parallel relation to the plane of the wipers, and the knives act to sever completely the surplus margin of the inner layer or layers from the rest of the upper materials. The operation of the trimming means is such that the side knives 66 act on the upper prior to the middle knife 64, the grippers maintaining their hold on the upper until these side knives have started their trimming operation, as illustrated in Fig. 13, whereupon the several grippers open and are moved farther outwardly to provide clearance for the knives. After the side knives have completed their operative movements the middle knife 64 acts, as illustrated in Figs. 14 and 15, to complete the severing of the surplus material.

Each side knife 66 is secured to a knife holder 68 (Figs. 1, 5 and 7) the upper portion of which is curved in a horizontal plane (Fig. 1) and is provided with flanges movable along curved guideways 70 in the carrier 24, these guideways being curved, as above suggested, about a vertical axis located opposite the end of the toe of the shoe. The flanges are supported underneath by gibs 72 (Fig. 5). Each knife 66 is adjustable heightwise of the shoe relatively to its holder 68, and is held in adjusted position by a clamping screw 74 threaded in the knife and extending through a slot 76 in the holder. A fine adjustment of the knife is facilitated by the provision of a screw 78 which is threaded in a lug on the holder 68 and arranged to bear on the upper edge of the knife. The two holders 68 are connected by links 80 (Fig. 1) to the outer ends of levers 82 which are pivotally mounted at their inner ends on studs 84 (Fig. 6) on the carrier 24. Studs 86 connecting the links 80 to the holders 68 extend through slots 88 in the carrier 24. The levers 82 are controlled by a slide 90 (Fig. 6) movable lengthwise of the shoe along guideways on the carrier 24 and held on its guideways by a pair of gibs 92 and another pair of gibs 94. Formed on the opposite side edges of this slide are cam faces 96 engaged by rolls 98 mounted on the levers 82. Accordingly, upon rearward movement of the slide 90, i. e., movement toward the left in Fig. 6, the cam faces 96 act on the rolls 98 to swing the levers 82 outwardly about the studs 84 and thus to impart operative movements to the side knives 66. After these knives have thus been operated the rolls are engaged by parallel side edges 100 of the slide 90 to permit further movement of the slide while the side knives remain stationary. These knives are returned to their initial positions, upon reverse forward movement of the slide 90, by engagement of a crossbar 102 fast on the slide with the rolls 98.

Operative rearward movement is imparted to the slide 90 by a fluid-operated piston 104 mounted in a cylinder 106 which is integral with the carrier 24, the piston being connected by a link 108 to one arm 110 of a three-armed lever 112 mounted to swing about a pin 114 supported in upwardly extending webs of the carrier 24. A second arm 116 of the three-armed lever is connected by a link 118 to a pin 120 mounted in lugs on the slide 90. Accordingly, upward movement of the piston 104 serves to move the slide 90 in a rearward direction, this movement being limited by engagement of a lug 122 on the arm 116 with a face 124 on the cylinder 106. Return movement of the slide 90 is effected by springs 126 connected to a pin 127 on the carrier 24 and to short arms 128, one of which is shown in Fig. 5, integral with the three-armed lever 112. Such return movement of the slide is limited by engagement of the crossbar 102 thereon with the rolls 98, the latter engaging the cam faces 96 on the slide. Fluid is admitted to the cylinder 106 from a pipe line 130 (Fig. 1) a portion of which is flexible to permit the swinging movements of the carrier 24. Admission and exhaust of fluid to and from the cylinder are controlled by an appropriate automatically operated valve (not herein shown), as disclosed in the previously mentioned application.

The middle knife 64 is supported on the lower front end of a curved arm 132 which extends rearwardly and is pivotally mounted at its rear end for swinging movements heightwise of the shoe on the pin 120. The knife is adjustable relatively to this arm and is secured in adjusted position by a clamp screw 134 threaded in the knife and extending through a slot 136 in the arm. Two set screws 138 (Figs. 1 and 12) threaded in the arm and engaging the upper surface of the knife are provided to assist in obtaining a fine adjustment of the knife about an axis extending lengthwise of the shoe. The front end of the arm 132 is held initially upraised by a spring 140 connected to the arm above the pivot pin 120 and to a pin 142 on the slide 90. The initial position of the arm is determined by engagement of a lug 144 on its rear end with the top face of the slide 90, as illustrated in Figs. 5 and 6. It will be evident that the arm 132 is carried rearwardly by the slide 90, but it remains upraised until the side knives 66 have been swung substantial distances away from each other. The arm is then swung downwardly to carry the knife 64 to the same plane as the side knives, and by further movement of the slide 90 thereafter the knife 64 is moved rectilinearly to complete the upper-trimming operation. For thus swinging the arm downwardly there is provided a lever 146 pivotally mounted on a pin 148 in the upstanding web portions of the carrier 24 and provided with a roll 150 arranged to engage a plate 152 fast on the arm. A third arm 154 of the three-armed lever 112 carries a roll 156 which by engagement with a rearwardly extending arm 158 of the lever 146 holds this lever initially with the roll 150 retracted rearwardly beyond the plate 152. As the three-armed lever 112 receives its operative movement the roll 156 is carried downwardly along the rear face of the lever 146 and by engagement with a cam face 160 on this lever swings it in a forward direction as the arm 132 is being carried rearwardly. This causes the roll 150 to act on an inclined edge 162 of the plate 152 to impart a quick downward movement to the arm 132, after which the roll engages the top face of the plate to maintain the knife 64 at the proper height during its action on the upper materials. At this time the lever 146 is held stationary by engagement of the roll 156 with a face 164 of the lever which is curved on an arc concentric with the axis of the pin 114. As the arm 132 is swung downwardly a lug 166 extending upwardly from the slide 90 enters a recess 168 in the arm to insure by engagement with the side walls of this recess that the arm is held properly positioned laterally. To insure against damage in case the arm 132 should be swung accidentally downward when the machine is idle, a lug 170 (Fig. 1) on the arm is arranged to engage a lug 172 formed on one of the gibs 94.

It is desirable during the upper-trimming operation to hold the margin of the toe end of the insole down on the last out of the way of the trimming knives. The machine is accordingly provided with a holddown 174 comprising a rod curved similarly to the edge of the toe end of the insole and having upwardly extending portions 176 mounted in brackets 178 fast on the carrier 24. The curved portion of the rod thus engages the insole between the latter and the paths of movement of the trimming knives. The upwardly extending portions 176 of the rod are adjustable vertically in upwardly extending tubular portions of the brackets 178, these tubular portions being split and encircled by split clamps 180 (Fig. 1) which are contracted by suitable screws to retain the holddown in adjusted position. It will be understood that the holddown is moved into engagement with the insole by the downward movement of the carrier 24.

The waste material severed from the toe end of the upper by the trimming knives is held on the arm 132 adjacent to the middle knife 64 by a retainer comprising a resilient curved plate 182 fastened to the arm by a screw 184, the lower end of this plate being bent toward the edge of the knife 64 but being spaced far enough therefrom to permit the waste material, when this knife is operated, to be forced upwardly between the knife and the lower edge of the plate, as illustrated in Figs. 14 and 15. Accordingly, the waste material is supported by the arm 132 when the arm is swung upwardly and moved forwardly after the upper-trimming operation and during the subsequent movements of the carrier 24 to carry the trimming means away from over the shoe and to bring the cement-applying means 22 into position to operate on the shoe. The machine is further provided with means for removing the waste material from the arm 132 when the cement-applying means is in engagement with the shoe. Fast on the left-hand side of the frame of the machine is a casting 186 (Fig. 1) formed to serve as a receptacle for the waste material, and secured to this casting within the receptacle by screws 188 (Figs. 1 and 9) is a bracket 190. The screws extend through slots 192 in the casting to permit the bracket to be adjusted vertically. Rotatable in the bracket 190 is a shaft 194, and clamped on the upper end of this shaft is a collar 196 on which is secured a clearer plate 198 (Fig. 3). This plate has therein a recess 200 which receives the lower end of the trimming knife 64, as illustrated in Fig. 4, when the plate is swung by rotation of the shaft 194 after the carrier 24 has moved the knife downwardly in carrying the cement-applying means into engagement with the shoe. In such swinging movement of the plate 198 an upwardly extending end portion 202 thereof is arranged to engage the waste material, indicated at 204 in Figs. 1 and 4, and to remove it from the trimming knife so that it falls into the receptacle provided by the casting 186.

To provide clearance for the end portion 202 of the plate 198, mechanism is provided for swinging the resilient waste-retaining plate 182 away from the knife 64 to the position illustrated in Fig. 4. This mechanism comprises a pin 206 (Figs. 5 and 11) slidingly mounted in the arm 132 with its rear end in engagement with the plate 182, a member 208 pivotally mounted on the arm and provided with a screw 210 arranged to engage the front end of the pin 206, and a rod 212 pivotally connected to the member 208 and extending downwardly through an opening in a lug 213 on the arm 132 in position for its lower end to engage a plate 214 (Figs. 1 and 9) secured to the bracket 190 when the trimming means is carried downwardly toward the waste-removing means in the manner above described. It will be understood that in response to engagement of the plate 214 with the rod 212 the member 208 is swung to force the pin 206 rearwardly and thus to move the lower end portion of the waste-retaining plate 182 into the position illustrated in Fig. 4. A comparatively light spring 216 on the rod 212 serves to maintain the member 208 normally in such a position as to avoid interference between the lower end of the rod and other parts of the machine. It will be noted by reference to Fig. 9 that the shaft 194 is somewhat inclined, the purpose being to cause the clearer plate 198 to operate in a plane substantially parallel to the plane of the cutting edge of the knife 64 when the knife is inclined relatively to the carrier 24 in the manner illustrated in Fig. 5, as it is at the time when the clearer plate acts to remove the waste material. It will be understood that under some conditions the waste material will be released and will fall into the receptacle as a result of the swinging of the waste-retaining plate 182 away from the knife 64, before the clearer plate receives its operative movement.

The shaft 194 is rotated to operate the clearer plate 198 by a fluid-operated piston 218 (Fig. 10) movable in a cylinder 220 which is a part of the bracket 190. The piston is provided with rack teeth 222 in engagement with a pinion 224 fast on the shaft 194, and its movements in opposite directions are limited by a screw 226 which is threaded in the piston and arranged to engage the cylinder 220 at opposite ends of a slot 228 therein. A torsion spring 230 (Fig. 9) serves to turn the shaft 194 in the direction to impart return movement to the clearer plate and the piston. The piston is operated by fluid admitted to the cylinder 220 from a pipe 232 (Fig. 1)

which leads from the source of fluid supply, the admission of fluid to the cylinder and the exhaust of the fluid therefrom being controlled automatically by valve (not shown).

The cement-applying device 22, as herein shown, is so constructed as to adapt it for use to apply thermoplastic cement maintained by heat in a liquid condition to the insole to fasten the toe end of the upper to the insole, although cement of a different kind may be used if desired. For this purpose the carrier 24 serves as a support for a casting 234 (Figs. 1 and 8) having therein a cement-containing chamber 236. The casting 234, which thus serves as a cement receptacle, is supported directly by means of rods 238 and 240 on the front ends of upper and lower pairs of parallel links 242 and 244 the rear ends of which are mounted respectively on rods 246 and 248 on the carrier 24. The two upper links 242 are connected together by a web 250, and threaded in an ear 252 (Fig. 2) on this web is a screw 254 the lower end of which is controlled by a compression spring 256 mounted in a socket in the carrier 24. This spring tends to swing the links 242 and 244 downwardly, the limit of such downward movement of the links and of the casting 234 being adjustably determined by a screw 258 which is threaded in an ear 260 on one of the links 242 and is arranged to engage a vertical face 262 on the carrier 24. It will be understood that the spring 256 is yieldable to permit any further downward movement of the carrier 24 which may take place after downward movement of the casting 234 is stopped by the shoe in the manner hereinafter explained. To maintain the cement in the chamber 236 in a liquid condition the casting 234 is heated by electrical heating units 264 (Fig. 1) mounted in bores therein.

Figure 16:
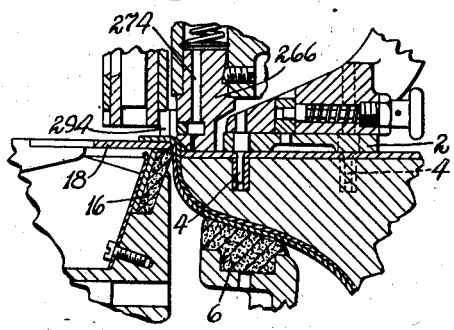
Figure 17:
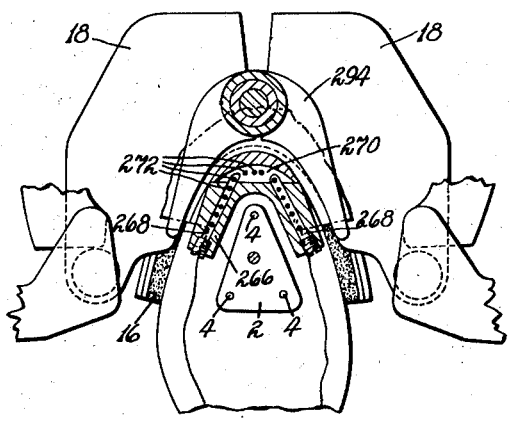
Fig. 17 is a view partly in plan and partly in section showing certain parts at the same stage in the cycle as in Fig. 16.

Mounted in a bore in the lower end of the casting 234 is a cylindrical upwardly extending portion of a block 266 the lower portion of which is of horseshoe shape, as illustrated in Fig. 17, and is provided with two bores 268 communicating with each other through a chamber 270. This horseshoe-shaped portion of the block is arranged to engage the marginal portion of the toe end of the insole, as illustrated in Figs. 16 and 17, and extending through it from the bores 268 and the chamber 270 are holes 272 through which cement is applied to the insole. The chamber 270 communicates through an upwardly extending bore 274 in the block 266 with a chamber 276 in the casting 234, and this chamber is arranged to communicate with another chamber 278 from which a passage 280 leads to the cement-containing chamber 236. Leading upwardly from the chamber 278 is a bore 282 in the casting 234, in which is mounted a pump plunger 284. Normally closing the passage 280 is a ball valve 286 held on its seat by a spring 288 mounted between the valve and the lower end of the plunger 284, and normally closing communication between the chamber 276 and the chamber 278 is a ball valve 290 held on its seat by a spring 292. When the plunger 284 is moved upwardly it draws cement past the valve 286 into the chamber 278, and when it is moved downwardly it forces cement past the valve 290 into the chamber 276 and thence through the passage 274 and the holes 272 to deliver it on the toe end of the insole. The plunger 284 is moved downwardly to deliver the cement in the manner described as a result of the downward movement of the carrier 24 to carry the cement-applying device toward the shoe by the action of means not herein fully shown but disclosed in the previously mentioned application. As also fully disclosed in that application, the carrier 24 is further provided with a retarder 294 for clamping the margin of the outer layer of the upper on the wipers 18 to assist in controlling it in the lasting operation, in which operation the block 266 is wedged upwardly by the action of the wipers and the upper thereon against the resistance of the spring 256 to permit the wipers to wipe the margin of the outer layer inwardly over the insole.

The manner of operation of the machine, in so far as it is of interest with reference to the present invention, will now be briefly summarized. After the shoe has been presented in the position determined by the member 2 and the pins 4 and after the starting of the power operation of the machine the toe rest 6, the instep support 8 and the heel rest 10 are moved into the shoe-supporting positions in which they are shown in Fig. 11. Shortly after the beginning of the cycle of operations also the grippers 12 and 14 are operated to pull the upper in outward directions, and while these grippers are holding the upper under tension the toe former 16 and the wipers 18 are moved upwardly to cause the toe former to wipe the upper heightwise of the last, the parts then occupying the positions in which they are shown in Fig. 11. In the meantime the carrier 24 has been moved downwardly to carry the upper-trimming means into operative position in response to the admission of fluid to the cylinder 28. Immediately after the wiping of the upper heightwise of the last fluid is admitted to the cylinder 106 to operate the three-armed lever 112 and thereby to impart rearward movement to the slide 90. As this slide begins its rearward movement its cam faces 96 act on the rolls 98 to impart outward swinging movements to the side trimming knives 66. Immediately after these knives begin to act on the upper (Fig. 13) the several grippers are opened to release the upper and are moved out of the paths of the knives. It will be understood that the knives, moving in a plane parallel to the wipers 18, cut through all but the outer layer of the outspread upper materials which is next to the wipers. As the side knives are being operated as described, bodily rearward movement is imparted by the slide 90 to the arm 132 which carries the middle knife 64, and upon engagement of the roll 156 on the three-armed lever 112 with the cam face 160 of the lever 146 the latter is swung in a forward direction to cause its roll 150 to act on the inclined edge 162 of the plate 152 and thereby to swing the arm 132 downwardly to position the middle knife 64 in the same plane as the side knives. By the time, therefore, when the side knives have completed their operative movements the middle knife is in position to act on the upper in response to further rearward bodily movement of the arm 132, the middle knife being maintained in the proper plane by engagement of the roll 150 with the top face of the plate 152. In this manner the middle knife completes the upper-trimming operation as illustrated in Figs. 14 and 15, the waste material removed from the upper being received in the space between the middle knife and the waste-retaining plate 182. As soon as the trimming operation is completed fluid is released from the cylinder 28 to permit the carrier 24 to be moved upwardly by the spring 60, and at approximately the same time fluid is released from the cylinder 106 to permit the slide 90 to be returned by the springs 126 and the arm 132 to be swung upwardly by the spring 140. Thereafter fluid is admitted to the cylinder 40 to swing the carrier 24 into the position in which the upper-trimming means is over the waste receptacle 180 and the cement-applying means 22 is over the shoe. Admission of fluid once more to the cylinder 28 then causes the carrier 24 to move downwardly to carry the cement-applying means into engagement with the shoe, as illustrated in Fig. 16, and to apply cement to the shoe. In response to this downward movement of the carrier the waste-retaining plate 182 on the arm 132 is swung rearwardly away from the middle knife 64 by the action of the stationary plate 214 on the rod 212. The knife 64 is then in such relation to the clearer plate 198 that any waste upper material which may still remain between the knife and the plate 182 will be removed by a swinging movement of the clearer plate in the manner illustrated in Fig. 4. Such movement of the clearer plate results from the admission of fluid to the cylinder 220, which occurs as the wipers 18 are operated to wipe the margin of the outer layer of the upper inwardly over the insole. Thereafter, in the course of the cycle of operations the carrier 24 is moved upwardly and is swung back to its initial position in proper time relation to return movements of other parts of the machine.

Claims on the combination of upper-trimming means and cement-applying means herein disclosed are presented in a divisional application Serial No. 473,936, filed on January 29, 1943.

Having described the invention, what I claim as new and desire to secure by Letters Patent of the United States is:

1. In a shoe machine, means for trimming the margin of an upper on a last, said upper-trimming means being movable relatively to the last into position for operating on the upper, a fluid-operated device for thus moving the upper-trimming means by fluid pressure, and another fluid-operated device movable with said upper-trimming means for thereafter operating said trimming means to trim the upper.

2. In a shoe machine, means for trimming from the toe end of a multi-ply upper on a last the margin of one or more inner layers of the upper materials while leaving a margin of the outer layer to be lasted over an insole, a support for said upper-trimming means movable to carry said means toward the last heightwise thereof prior to its operation on the upper, a fluid-operated device for thus moving said support by fluid pressure, and another fluid-operated device carried by said support for operating the upper-trimming means.

3. In a shoe machine, upper-trimming means movable outwardly from opposite the bottom of a last to trim from the toe end of a multi-ply upper on the last the margin of one or more inner layers of the upper materials while leaving a margin of the outer layer to be lasted over an insole on the last, and holddown means relatively to which the upper-trimming means is thus movable, said holddown means comprising a member curved similarly to the edge of the toe end of the insole and arranged to engage the margin of the insole substantially all around the toe between the latter and the upper-trimming means in a location adjacent to the portion of the upper to be trimmed to hold the margin of the insole against the bottom of the last in the upper-trimming operation.

4. In a shoe machine, upper-trimming means movable outwardly from opposite the bottom of a last to trim from the toe end of a multi-ply upper on the last the margin of one or more inner layers of the upper materials while leaving a margin of the outer layer to be lasted over an insole on the last, said upper-trimming means being movable heightwise of the last into position for thus operating on the upper, and holddown means movable heightwise of the last with said upper-trimming means into position to engage the insole between the latter and the upper-trimming means and thereby to hold the margin of the insole against the bottom of the last in the upper-trimming operation, the upper-trimming means being movable relatively to said holddown means in the upper-trimming operation.

5. In a shoe machine, mechanism for trimming from the toe end of a multi-ply upper on a last the margin of one or more inner layers of the upper materials while leaving a margin of the outer layer to be lasted over an insole, said mechanism comprising a plurality of trimming knives movable respectively in different directions outwardly from positions opposite the bottom of the last to perform the trimming operation and each having a cutting edge arranged to cut the materials on a line generally parallel to the edge of the last bottom.

6. In a shoe machine, mechanism for trimming from the toe end of a multi-ply upper on a last the margin of one or more inner layers of the upper materials while leaving a margin of the outer layer to be lasted over an insole, said mechanism comprising a plurality of trimming knives movable respectively in different directions outwardly from positions opposite the bottom of the last to perform the trimming operation and each having a cutting edge arranged to cut the materials on a line generally parallel to the edge of the last bottom, and means for operating said knives, said operating means being constructed to cause different knives to operate on the upper in sequence.

7. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to perform the trimming operation, the middle knife being movable lengthwise of the last and the side knives widthwise of the last, a member movable lengthwise of the last thus to operate the middle knife, and means for operating the side knives also by that movement of said member.

8. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to perform the trimming operation, the middle knife being movable lengthwise of the last and the side knives widthwise of the last, a member movable lengthwise of the last thus to operate the middle knife, said member having cam faces thereon, and means for operating the side knives by said cam faces.

9. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to perform the trimming operation, the middle knife being movable lengthwise of the last and the side knives widthwise of the last, a member movable lengthwise of the last thus to operate the middle knife, levers connected to the side knives for operating them, and means for operating said levers by the movement of said member.

10. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, a member movable lengthwise of the last thus to operate the middle knife, and means for operating the side knives to perform their trimming operations on the upper by that movement of said member before the middle knife becomes effective to trim the upper.

11. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, a member movable lengthwise of the last thus to operate the middle knife, and levers connected to the side knives for operating them, said member being provided with cam faces for operating said levers to cause the side knives to perform their trimming operations on the upper before the middle knife becomes effective to trim the upper.

12. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, and means automatically movable in time relation to the side knives for moving the middle knife also heightwise of the last relatively to the side knives into position to perform its trimming operation on the upper.

13. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, means for moving the side knives widthwise of the last to make way for the middle knife and to perform their trimming operations before the middle knife acts on the upper, and additional means automatically movable in time relation to the side knives for moving the middle knife heightwise of the last relatively to the side knives and for also moving it lengthwise of the last to perform its trimming operation.

14. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, an arm supporting the middle knife and mounted for swinging movement heightwise of the last, means for moving the side knives in a plane to perform their trimming operations, and means for swinging said arm to carry the middle knife to the same plane and for thereafter moving the arm rectilinearly to cause the middle knife to perform its trimming operation.

15. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, an operating member movable lengthwise of the last, means for operating the side knives by the movement of said member, an arm supporting the middle knife and mounted on said member for swinging movement heightwise of the last, and means for swinging said arm to carry the middle knife toward the last in the course of the movement of said member before the middle knife begins its trimming operation on the upper.

16. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, an operating member movable lengthwise of the last, a lever for operating said member, means for operating the side knives by the movement of said member, an arm supporting the middle knife and mounted on said member for swinging movement heightwise of the last, and a second lever arranged to be operated by said first-named lever to swing said arm to carry the middle knife toward the last before it begins its trimming operation on the upper.

17. In a shoe machine, mechanism for trimming from the toe end of a multi-ply upper on a last the margin of one or more inner layers of the upper materials while leaving a margin of the outer layer to be lasted over an insole, said mechanism comprising a middle knife and side knives movable outwardly from positions opposite the bottom of the last to trim the upper, the middle knife being movable lengthwise of the last and the side knives widthwise of the last, an operating member movable lengthwise of the last, a lever for operating said member, means for operating the side knives by the movement of said member, an arm supporting the middle knife and mounted on said member for swinging movement heightwise of the last, and a second lever arranged to be operated by said first-named lever to swing said arm to carry the middle knife toward the last in the course of the movement of said operating member, said second lever having means for engaging said arm to control the middle knife thereafter in its upper-trimming operation.

18. In a shoe machine, upper-trimming means arranged to sever surplus marginal material from an upper on a last by movement outwardly from opposite the bottom of the last, said upper-trimming means being movable away from the last after thus operating on the upper, and a waste-retaining device movable with the upper-trimming means to carry away from the last the waste material removed from the upper.

19. In a shoe machine, upper-trimming means comprising a trimming knife arranged to sever surplus marginal material from an upper on a last, said upper-trimming means being movable away from the last after thus operating on the upper, and a resilient waste-retaining member arranged to cooperate with said knife to hold the waste material removed from the upper and to carry it away from the last with the upper-trimming means.

20. In a shoe machine, upper-trimming means arranged to sever surplus marginal material from an upper on a last by movement outwardly from opposite the bottom of the last, said upper-trimming means being movable away from the last after thus operating on the upper, a waste-retaining device movable with the upper-trimming means to carry away from the last the waste material removed from the upper, and means for operating said device to release the waste material after it has been carried away from the last.

21. In a shoe machine, upper-trimming means comprising a trimming knife arranged to sever surplus marginal material from an upper on a last, said upper-trimming means being movable away from the last after thus operating on the upper, a resilient waste-retaining member arranged to cooperate with said knife to hold the waste material removed from the upper and to carry it away from the last with the upper-trimming means, and means for bending said resilient member to release the waste material after it has been carried away from the last.

22. In a shoe machine, upper-trimming means arranged to sever surplus marginal material from an upper on a last, said upper-trimming means being movable to a different position after thus operating on the upper, a waste-retaining device movable with the upper-trimming means to carry the waste material removed from the upper, and means for operating said waste-retaining device to release the waste material in response to the movement of the upper-trimming means toward said different position.

23. In a shoe machine, upper-trimming means arranged to sever surplus marginal material from an upper on a last, said upper-trimming means being movable to a different position after thus operating on the upper, a waste-retaining device movable with the upper-trimming means to carry the waste material removed from the upper, mechanism also movable with the upper-trimming means for operating said device to release the waste material, and a member into engagement with which said mechanism is carried by the movement of the upper-trimming means toward said different position to cause it thus to operate said device.

24. In a shoe machine, upper-trimming means arranged to sever surplus marginal material from an upper on a last, said upper-trimming means being movable to a different position after thus operating on the upper while carrying waste material removed from the upper, and means for removing the waste material from the upper-trimming means after it has arrived in said different position.

25. In a shoe machine, upper-trimming means arranged to sever surplus marginal material from an upper on a last, said upper-trimming means being movable to a different position after thus operating on the upper while carrying waste material removed from the upper, and mechanism into operative relation to which the upper-trimming means is thus movable for removing therefrom the waste material.

26. In a shoe machine, upper-trimming means comprising a trimming knife arranged to sever surplus marginal material from an upper on a last, said upper-trimming means being movable to a different position after thus operating on the upper while carrying waste material removed from the upper, a member movable relatively to said knife to remove the waste material when the upper-trimming means is in said different position, a fluid-operated device for operating said member, and a spring for imparting return movement to said member.

27. In a shoe machine, upper-trimming means arranged to sever surplus marginal material from an upper on a last, said upper-trimming means being movable away from the last after thus operating on the upper, a waste-retaining device movable with the upper-trimming means to carry away from the last the waste material removed from the upper, and means for removing the waste material controlled by said device after it has been carried away from the last.

28. In a shoe machine, upper-trimming means arranged to sever surplus marginal material from an upper on a last, said upper-trimming means being movable away from the last after thus operating on the upper, a waste-retaining device movable with the upper-trimming means to carry away from the last the waste material removed from the upper, means for operating said device to release the waste material, and means for removing the waste material when it is released by said device.

29. In a shoe machine, upper-trimming means comprising a trimming knife arranged to sever surplus marginal material from an upper on a last, said upper-trimming means being movable away from the last after thus operating on the upper, a resilient waste-retaining member arranged to hold between it and said knife the waste material removed from the upper to carry the waste material away from the last, means for bending said resilient member away from the knife to release the waste material, and a waste-removing member movable along the edge of the knife between it and said resilient member to remove the waste material when it is thus released.

30. In a shoe machine, upper-trimming means arranged to sever surplus marginal material from an upper on a last, said upper-trimming means being movable to a different position after thus operating on the upper, a waste-retaining device movable with the upper-trimming means to carry the waste material removed from the upper, means for operating said waste-retaining device to release the waste material in response to the movement of the upper-trimming means toward said different position, and mechanism toward which the upper-trimming means is thus movable for removing the waste material therefrom when the upper-trimming means is in said different position.

31. In a shoe machine, upper-trimming means arranged to sever surplus marginal material from an upper on a last by movement outwardly from opposite the bottom of the last, a waste-retaining device arranged to receive and retain the waste material removed from the upper, and means for operating said device after the upper-trimming operation to release the waste material.

32. In a shoe machine, upper-trimming means comprising a trimming knife arranged to sever surplus marginal material from an upper on a last, a waste-retaining device arranged to hold between it and said knife the waste material thus removed from the upper, and means for moving said device away from the knife after the upper-trimming operation to release the waste material.

33. In a shoe machine, upper-trimming means arranged to sever surplus marginal material from an upper on a last, a waste-retaining device arranged to receive and retain the waste material thus removed from the upper, means for operating said device after the upper-trimming operation to release the waste material, and means for removing the waste material when it is thus released.

34. In a shoe machine, upper-trimming means comprising a trimming knife arranged to sever surplus marginal material from an upper on a last, a waste-retaining device arranged to hold between it and said knife the waste material removed from the upper, means for moving said device away from the knife to release the waste material after the upper-trimming operation, and a member movable between said device and the knife to remove the waste material when it is thus released.

35. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, and a waste-retaining device movable with the middle knife to receive and control the waste material removed from the upper.

36. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, the middle knife being movable away from the last after the trimming operation, a waste-retaining device movable with the middle knife to carry away from the last the waste material removed from the upper, and means for operating said device to release the waste material after it has been carried away from the last.

37. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, the middle knife being movable to a different position after the trimming operation, a waste-retaining device movable with the middle knife to carry the waste material removed from the upper, and means for operating said waste-retaining device to release the waste material in response to the movement of the middle knife toward said different position.

38. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, a support for said middle knife movable to carry the knife to a different position after the trimming operation, a waste-retaining device on said support arranged to cooperate with the middle knife to carry the waste material removed from the upper, mechanism on said support for operating said device to release the waste material, and a member into engagement with which said mechanism is carried by said support to cause it thus to operate said device.

39. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, the middle knife being movable to a different position after the trimming operation, a waste-retaining device movable with said knife to carry the waste material removed from the upper, and means for removing the waste material controlled by said device after the middle knife has arrived in said different position.

40. In a shoe machine, means for trimming from the toe end of a multi-ply upper on a last the margin of one or more inner layers of the upper materials while leaving a margin of the outer layer to be lasted over an insole, said upper-trimming means comprising side knives movable widthwise of the last and a middle knife movable lengthwise of the last to complete the trimming operation after the side knives have acted on the upper, a waste-retaining device movable with said middle knife for holding the waste material removed from the upper, and means for operating said device after the upper-trimming operation to release the waste material.

BERNHARDT JORGENSEN.